(12) United States Patent
Reichen et al.

(10) Patent No.: US 9,560,800 B2
(45) Date of Patent: Feb. 7, 2017

(54) QUICK CHANGE ROTARY MOWER BLADE ASSEMBLY

(71) Applicant: DEERE & COMPANY, Moline, IL (US)

(72) Inventors: Ronald L. Reichen, Raleigh, NC (US); Harlin Trefz, Jackson, TN (US)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 14/250,644

(22) Filed: Apr. 11, 2014

(65) Prior Publication Data

US 2015/0289447 A1  Oct. 15, 2015

(51) Int. Cl.
*A01D 34/64* (2006.01)
*A01D 34/73* (2006.01)

(52) U.S. Cl.
CPC ............ *A01D 34/64* (2013.01); *A01D 34/733* (2013.01)

(58) Field of Classification Search
CPC ...... A01D 34/73; A01D 34/733; A01D 34/64; Y10T 403/7005; Y10T 403/7007; Y10T 403/60; Y10T 403/602; Y10T 403/606; Y10T 403/608
USPC ... 30/276, 374; 83/698.31, 698.41; 416/204 R, 416/205, 207, 214 R; 292/163, 164
See application file for complete search history.

(56) References Cited

U.S. PATENT DOCUMENTS

| | | | | |
|---|---|---|---|---|
| 2,707,362 A | * | 5/1955 | Thelander | A01D 34/6806 464/47 |
| 2,875,569 A | * | 3/1959 | Sauer | A01D 34/733 56/295 |
| 3,212,244 A | * | 10/1965 | Wilgus | A01D 34/74 56/11.9 |
| 3,564,824 A | * | 2/1971 | Tygh | A01D 34/73 56/295 |
| 3,783,591 A | * | 1/1974 | Sotak | A01D 34/74 56/10.2 R |
| 3,877,146 A | * | 4/1975 | Pittinger | A01D 34/73 30/264 |
| 4,586,257 A | * | 5/1986 | Rittenhouse | A01D 34/733 30/276 |
| 4,712,364 A | | 12/1987 | Oxley | |
| 4,765,127 A | * | 8/1988 | Hamblen | A01D 34/73 30/276 |
| 5,163,276 A | | 11/1992 | Mohrman | |
| 5,581,985 A | * | 12/1996 | Secosky | A01D 34/6806 56/10.3 |
| 5,622,035 A | | 4/1997 | Kondo et al. | |
| 5,782,073 A | | 7/1998 | Sheldon | |
| 5,960,617 A | | 10/1999 | Sheldon | |

(Continued)

FOREIGN PATENT DOCUMENTS

WO    20130049324 A1    4/2013

OTHER PUBLICATIONS

Search Report issued in counterpart application No. GB1505057.8, dated Aug. 26, 2015 (5 pages).

*Primary Examiner* — Alicia Torres
*Assistant Examiner* — Adam Behrens

(57) ABSTRACT

A quick change rotary mower blade assembly includes a mower blade attached to a blade assembly pin that is inserted into an internal bore in a spindle extending through a housing under the mower deck. A blade retainer on the lower end of the spindle has a pair of notches holding and locking the mower blade in place.

8 Claims, 6 Drawing Sheets

(56) References Cited

U.S. PATENT DOCUMENTS

| | | | |
|---|---|---|---|
| 6,205,755 B1* | 3/2001 | Bontrager | A01D 34/733 56/17.5 |
| 6,367,235 B1 | 4/2002 | Moynihan | |
| 6,681,865 B2 | 1/2004 | Pace | |
| 6,688,095 B2 | 2/2004 | Wadzinski | |
| 6,935,095 B1 | 8/2005 | Sluder | |
| 7,124,566 B2* | 10/2006 | Treger | A01D 34/73 56/255 |
| 7,506,494 B2 | 3/2009 | Eavenson, Sr. et al. | |
| 7,703,267 B2 | 4/2010 | Tapper | |
| 7,775,026 B2 | 8/2010 | Bever | |
| 7,784,254 B2 | 8/2010 | Bever | |
| 7,958,710 B2* | 6/2011 | Gilpatrick | A01D 34/733 56/17.5 |
| 8,869,369 B1 | 10/2014 | Roach | |
| 8,931,248 B2 | 1/2015 | Eavenson, Sr. et al. | |
| 8,935,909 B2 | 1/2015 | Eavenson, Sr. et al. | |
| 2005/0252009 A1 | 11/2005 | Alliss | |
| 2007/0006562 A1 | 1/2007 | Davis et al. | |
| 2007/0180706 A1* | 8/2007 | Guerra | A01D 34/733 30/276 |
| 2009/0308044 A1 | 12/2009 | Bever | |
| 2010/0326034 A1 | 12/2010 | Gilpatrick et al. | |
| 2011/0225832 A1 | 9/2011 | Alliss | |
| 2012/0110970 A1 | 5/2012 | Blarek | |
| 2013/0199148 A1 | 8/2013 | Goudeau, Jr. | |
| 2013/0327007 A1 | 12/2013 | Eavenson, Sr. et al. | |

* cited by examiner

(12) United States Patent

QUICK CHANGE ROTARY MOWER BLADE ASSEMBLY

FIELD OF THE INVENTION

This invention relates to rotary mower blades on grass mowing machines, and specifically to the removal and installment of rotary mower blades to a mower deck spindle assembly.

BACKGROUND OF THE INVENTION

One issue that may dissatisfy users and customers of grass mowing machines is the amount of time and difficulty needed to remove and install rotary mower blades for sharpening or replacement. The blades normally are installed with a center attachment bolt and washer assembly that threads into a mower deck spindle assembly. The bolt then needs to be torqued to secure the blade to the spindle assembly. Depending on the size of the mower deck and the number of spindle assemblies, center attachment bolts may be difficult to reach and attach a wrench or socket to each bolt and tighten it sufficiently. Additionally, due to limited ground clearance and accessibility to the underside of the mower deck, there may be limited space to provide adequate leverage to the wrench or socket to break the bolt loose. The amount of torque required to break a bolt loose can be substantial if the blade has not been changed for a long time. This may require an additional lever or wood block to lock the blade into position for proper torqueing of the bolt.

A quick change rotary mower blade assembly is needed that allows removal and installment of the blade without a wrench or socket. A quick change rotary mower blade assembly is needed that is easy to use. A quick change rotary mower blade assembly is needed that does not require application of high torque to a center attachment bolt under the mower deck.

SUMMARY OF THE INVENTION

A quick change rotary mower blade assembly includes a spindle with an internal bore and a compression spring positioned in the internal bore, a blade retainer secured to a lower end of the spindle; the blade retainer having a pair of arms, a mower blade assembled to a shaft that is inserted into the internal bore to compress the spring, the spring exerting a force urging the shaft out so that the mower blade engages the pair of arms to lock the mower blade in the blade retainer. The quick change rotary mower blade assembly allows removal and installment of the blade without a wrench or socket, is easy to use, and does not require application of high torque to a center attachment bolt under the mower deck

DESCRIPTION OF THE PREFERRED EMBODIMENT

Figure 1:
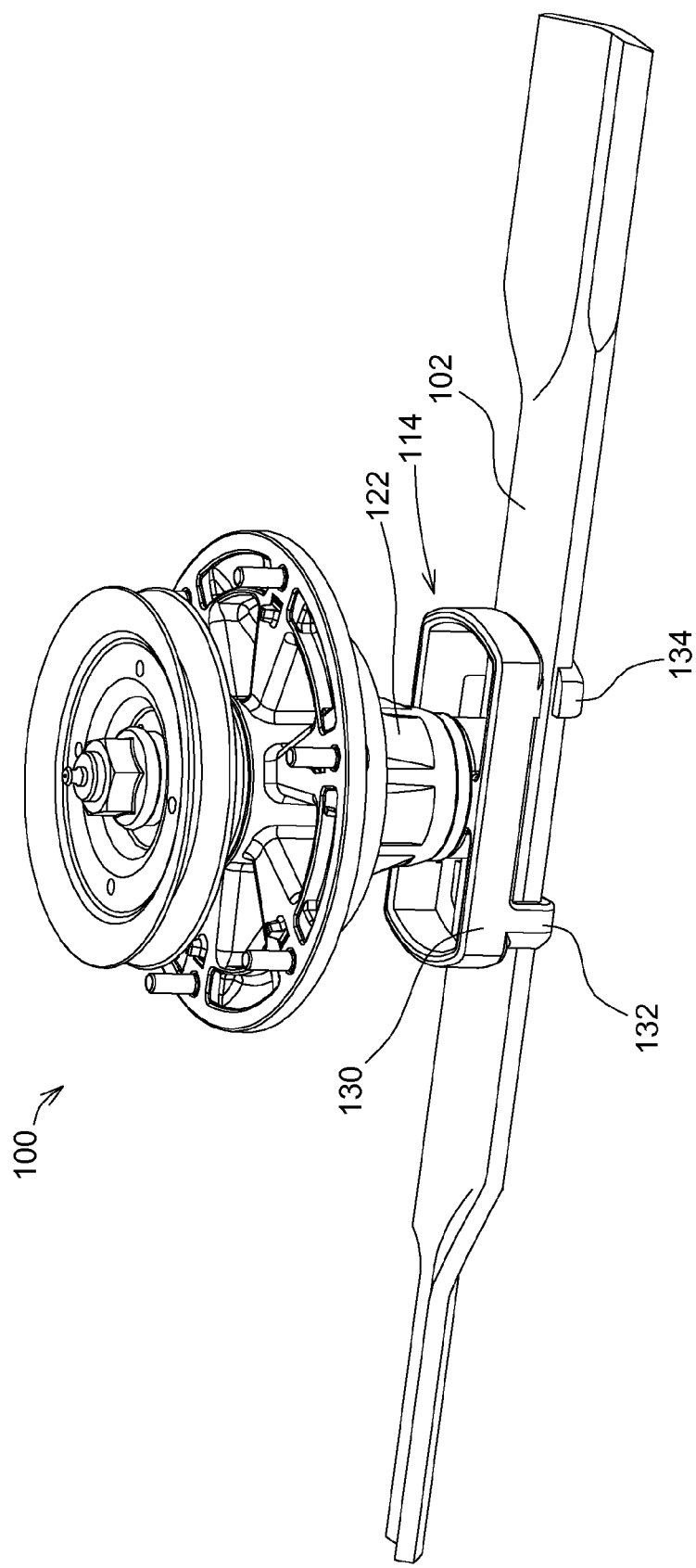
FIG. 1 is a perspective view of a quick change rotary mower blade assembly according to a first embodiment of the invention.
Figure 2:
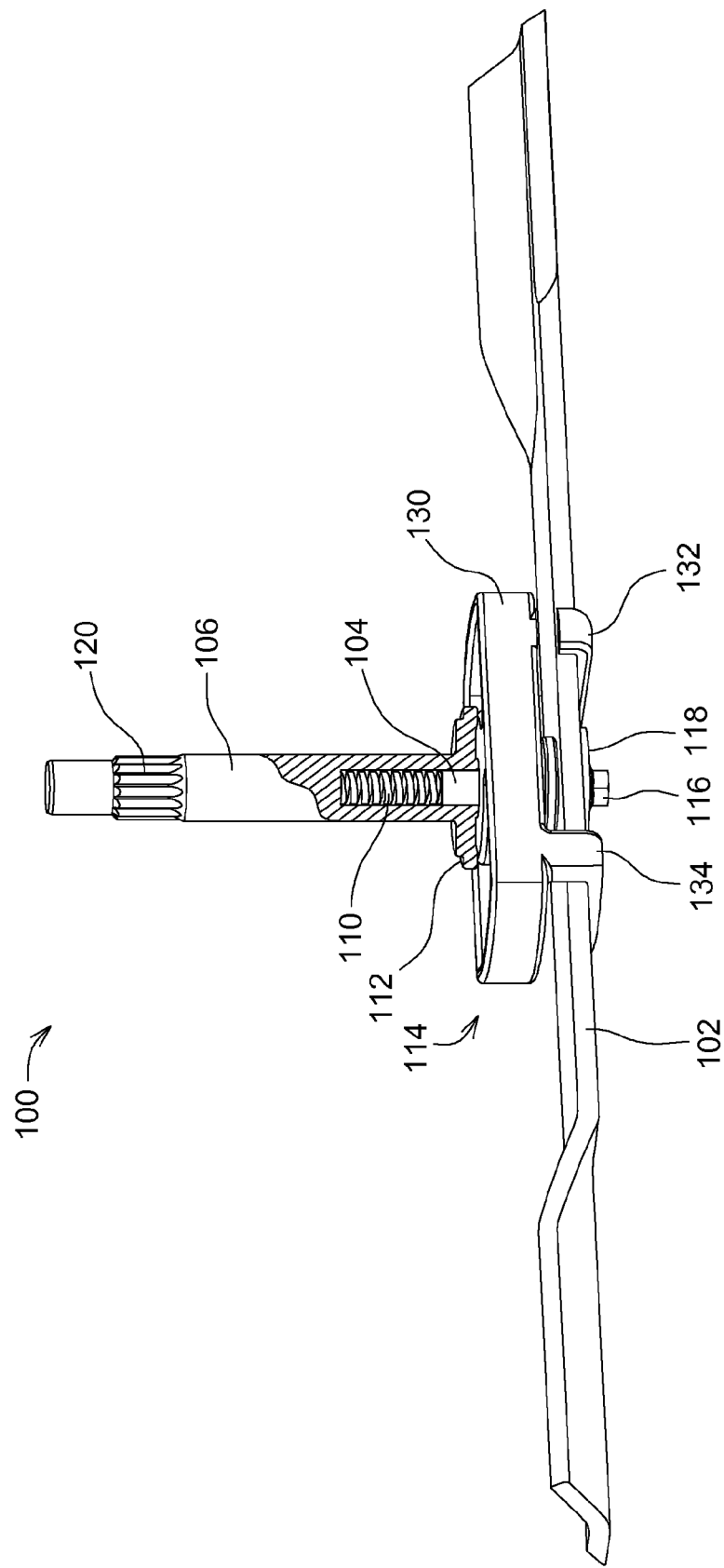
FIG. 2 is a perspective view, partially in section, of a quick change rotary mower blade assembly according to a first embodiment of the invention.
Figure 3:
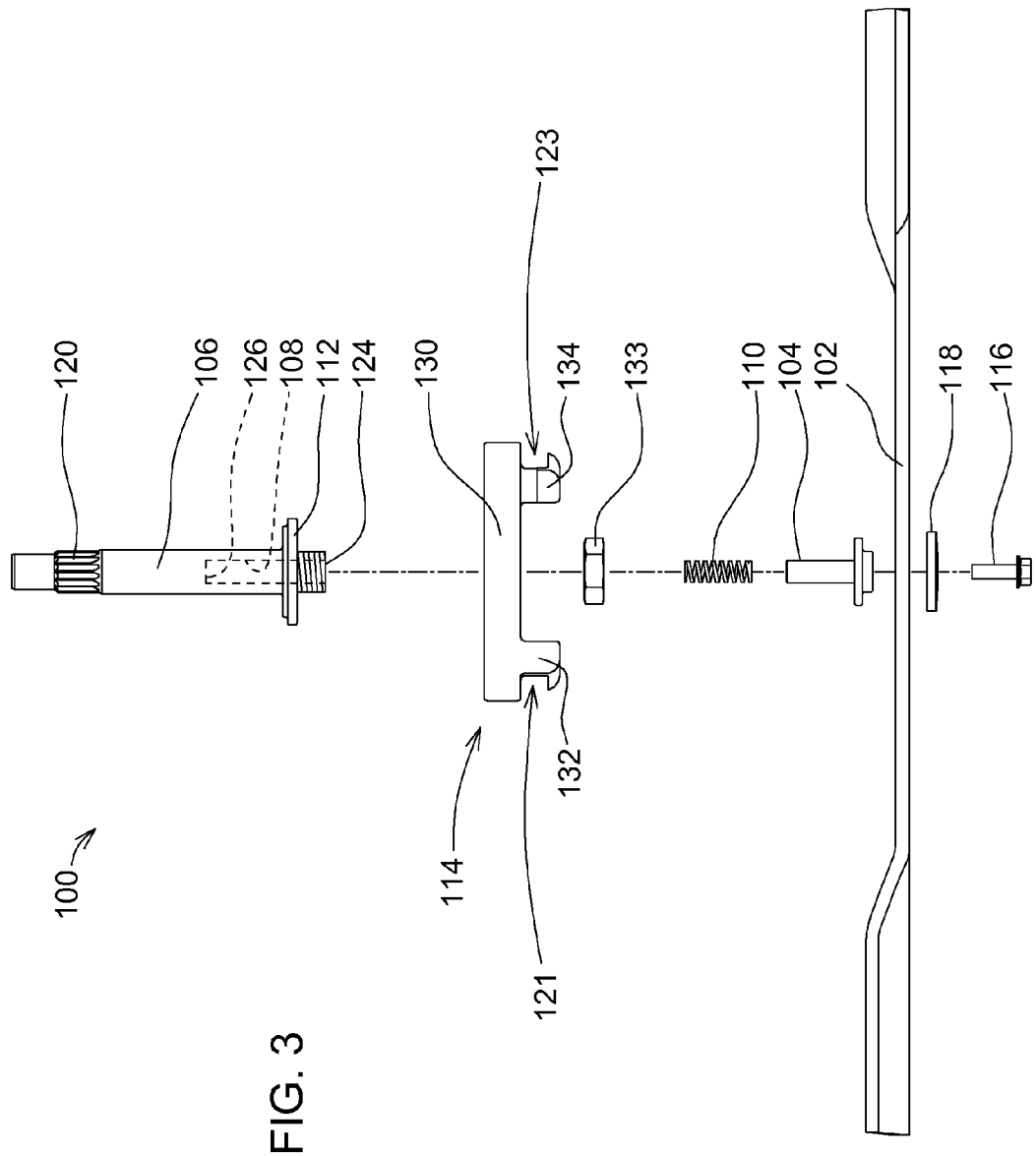
FIG. 3 is an exploded side view of a quick change rotary mower blade assembly according to a first embodiment of the invention.
Figure 4:
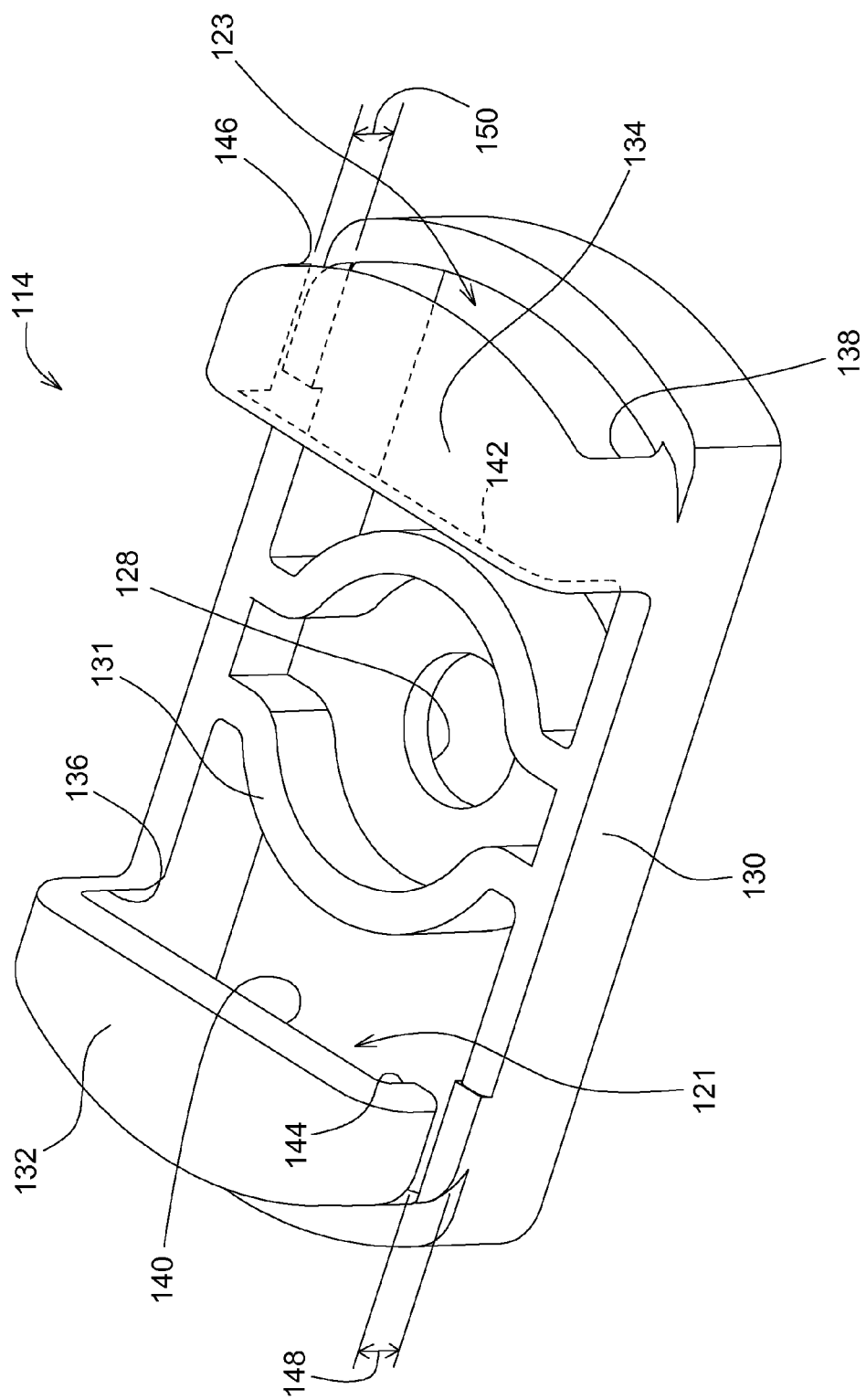
FIG. 4 is a perspective view of a retainer for quick change rotary mower blade assembly according to a first embodiment of the invention.

FIGS. 1-4 show one embodiment of quick change rotary mower blade assembly 100. The quick change rotary mower blade assembly includes rotary mower blade 102 secured to blade assembly pin 104. To install the blade and blade assembly pin onto spindle 106, the blade assembly pin may be inserted into an internal bore or center recess area 108 of the spindle. The blade and blade assembly pin may be pushed upward to compress spring 110 located in the bore or center recess area of the spindle. The upward motion may continue until the blade contacts retainer 114. The blade and blade assembly pin then may be rotated 90 degrees where the blade may be locked into the retainer. To remove the blade, the blade and blade assembly pin may be pushed up against spring 110, rotated 90 degrees to clear the retainer, and the spring pushes the blade assembly pin out of the spindle recess.

In a first embodiment, rotary mower blade 102 may be assembled to blade assembly pin 104 before installation onto spindle 106. The mower blade may be a conventional design having a center hole of various different configurations, and the blade assembly pin may be a cylindrical steel rod having a length of about 2 inches up to about 4 inches, a flange on one end, and an internally threaded bore. The mower blade may be secured to the blade assembly pin using bolt 116 inserted through the blade center hole and washer 118, and threaded into the blade assembly pin. The assembly of the blade and blade assembly pin may be done on a work bench instead of on or under the mower deck.

In a first embodiment, spindle 106 may have a splined upper end 120 secured to an output shaft, belt driven pulley or other rotational power source on or above a mower deck. Spindle 106 may extend through housing 122 which may be bolted or otherwise secured to the underside of the mower deck. Spindle 106 may have an internal bore or center recess area 108 extending from the bottom end 124 of the spindle and up through the spindle until terminating at internal shoulder 126. The internal bore should provide sufficient depth to accommodate loading of spring 110 depending on the length of the spring. Spring 110 may be a compression coil spring inserted into the internal bore of the spindle and may be secured or anchored therein. For example, the spring may have an axial length slightly less than the length of the internal bore, and a portion of the spring may have a larger diameter that engages a circumferential groove or slot in the internal bore. The spring may be fully compressed by an upwardly directed force of about 10 pounds applied manually to the blade and blade assembly pin after insertion into bore 108. Flange 112 may be adjacent the bottom end of the spindle, and preferably about ½ inch up to about 2 inches from the spindle's bottom end.

In a first embodiment, blade adapter or retainer 114 may be secured to the lower end of spindle 106 with threaded nut 133, or otherwise secured to the lower end of the spindle. For example, the blade adapter retainer may be a steel casting welded to flange 112. Alternatively, the blade adapter or retainer and spindle may be a unitary component. The blade adapter or retainer may have outer frame or perimeter 130 and a centrally positioned hole 128 that fits over the bottom end of the spindle. For example, the outer frame or perimeter of the blade adapter or retainer may have a generally rectangular shape, and the hole may be provided through bridge 131 extending between a first side and a second side of the rectangular outer frame or perimeter.

In a first embodiment, the blade adapter or retainer may include a pair of notches 121, 123 where the mower blade may be positioned. The pair of notches may be defined by a pair of arms 132, 134 that extend over and capture the rotary mower blade and hold the blade securely in place. Each arm may have a first upright 136, 138 extending from one side of the retainer's outer frame or perimeter and having an internal height substantially greater than the mower blade thickness, and preferably slightly more than twice the mower blade thickness. Each arm may have an intermediate cross member 140, 142 extending from the first upright, to a second upright on the opposite side of the retainer's outer frame or perimeter. Each intermediate cross member may have a surface that engages the blade and is generally parallel to the outer frame or perimeter's surface, and the surface may have a width substantially the same or close to the rotary mower blade width. Each arm also may have a second upright 144, 146 extending from the opposite side of the intermediate cross member toward the retainer's outer frame or perimeter, and may have a height that is substantially the same or slightly greater than the mower blade thickness, and also may provide a gap 148, 150 between the second upright and the outer frame or perimeter that is slightly greater than the mower blade thickness.

In a first embodiment, the blade and blade assembly pin may be inserted into and locked by the blade adapter or retainer by inserting blade assembly pin 104 into the spindle recess and rotating the blade 90 degrees into the opposing gaps 148, 150 between each of the second uprights and the retainer's outer frame or perimeter. After the blade enters the gap, the blade and blade assembly pin may be rotated until the edges of the blade pass the second uprights 144, 146 and spring 110 forces the blade to snap out against the intermediate cross members 140, 142 and between the first and second uprights, to hold and lock the blade into notches 121, 123 of the blade adapter or retainer.

Figure 5:
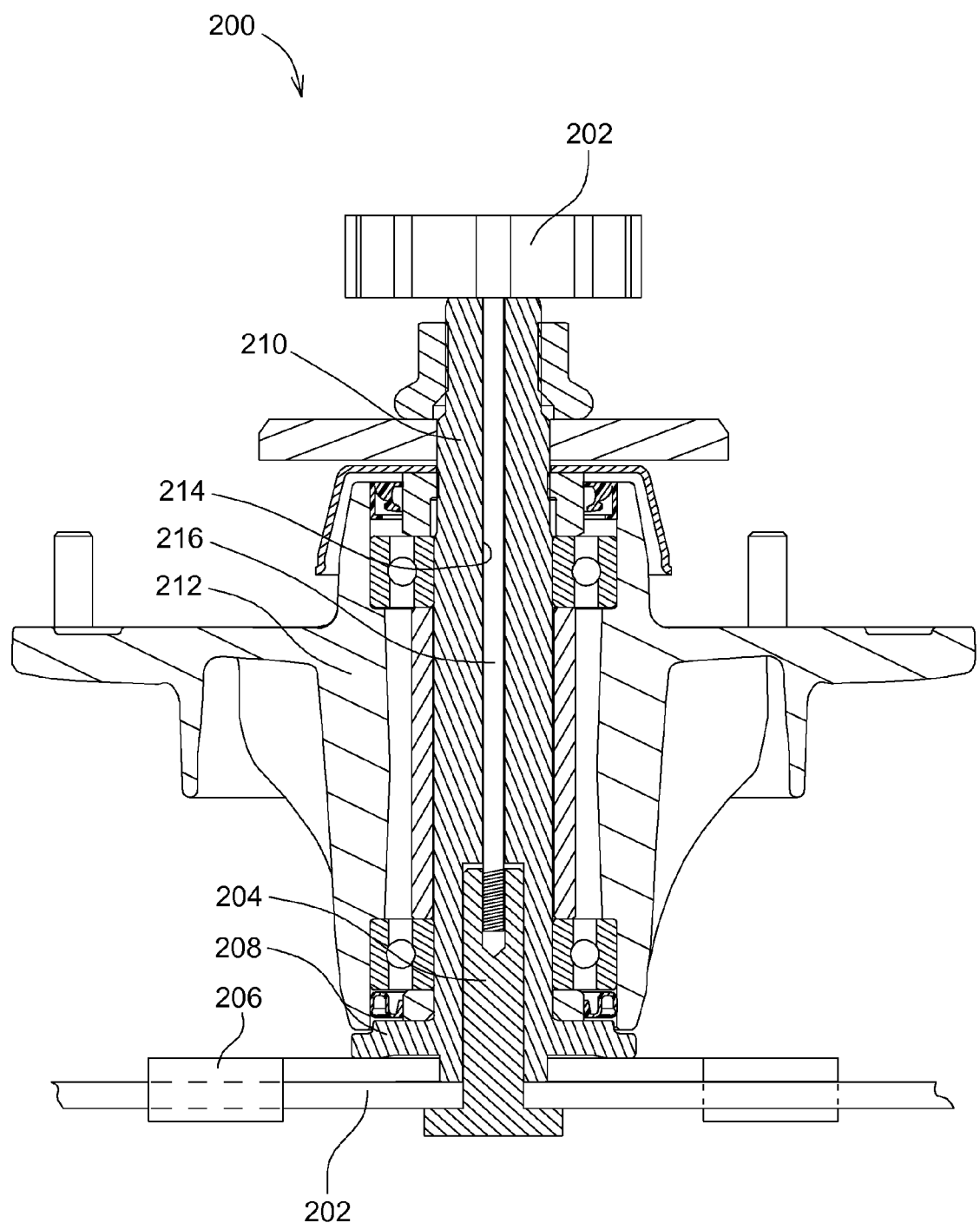
FIG. 5 is a side cross section view of a quick change rotary mower blade assembly according to a second embodiment of the invention.

In a second embodiment shown in FIG. 5, quick change rotary mower blade assembly 200 may be removed and installed from above the top surface of the mower deck. More specifically, mower blade 202 may be secured with a press fit to internally threaded blade assembly pin 204, and the blade and blade assembly pin may be engaged or disengaged from spindle 210 from above the mower deck. The blade and blade assembly pin then may be inserted into blade adapter or retainer 206 having a pair of arms. The blade adapter or retainer may be secured to the lower end of spindle 210 with a nut or welded to flange 208 on the lower end of spindle 210. Spindle 210 may extend vertically through housing 212 fastened to the underside of a mower deck. Spindle 210 may include internal bore 214. Rod 216 may extend through internal bore 214 and the lower end of the rod may be threaded to blade assembly pin 204. The upper end of rod 216 may be provided with knob or handle 202 that can be turned to tighten or loosen internally threaded blade assembly pin 204.

Figure 6:
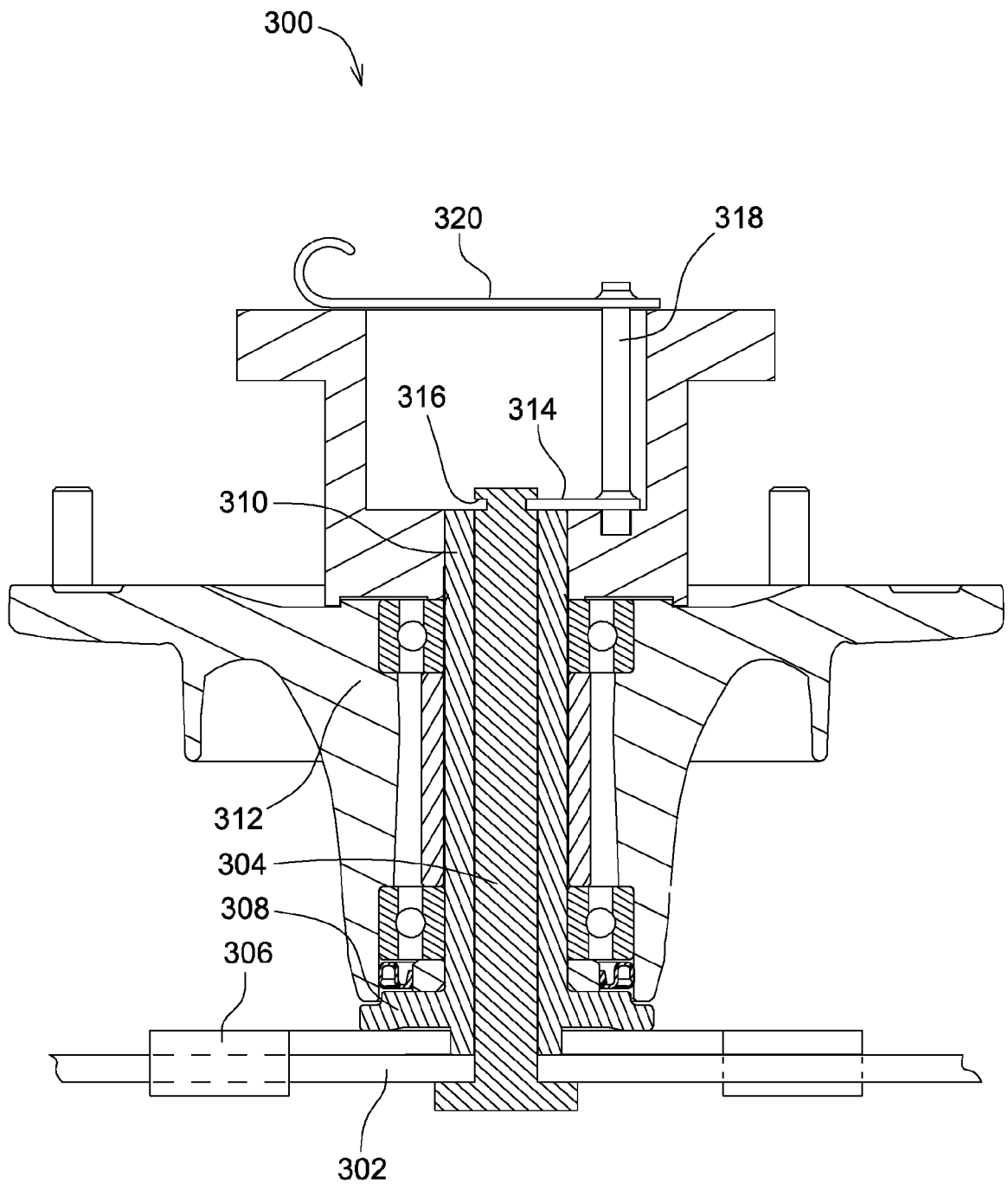
FIG. 6 is a side cross section view of a quick change rotary mower blade assembly according to a third embodiment of the invention.

In a third embodiment shown in FIG. 6, quick change rotary mower blade assembly 300 also may be removed and installed from above the top surface of the mower deck. As in the second embodiment, mower blade 302 may be secured with a press fit to internally threaded blade assembly pin 304. The blade and blade assembly pin then may be inserted into blade adapter or retainer 306. The blade adapter or retainer may have a pair of arms and may be secured to the lower end of spindle 310 with a nut or welded to flange 308 on the lower end of spindle 310. Spindle 310 may extend vertically through housing 312 fastened to the underside of a mower deck. The upper end of the spindle may have a groove or slot 316 that may be releasably engaged to latch 314. The latch may connect to rod 318 and handle 320 above the mower deck to engage or disengage the mower blade assembly from a locked position.

Having described the preferred embodiment, it will become apparent that various modifications can be made without departing from the scope of the invention as defined in the accompanying claims.

The invention claimed is:

1. A quick change rotary mower blade assembly, comprising:
   a spindle with an internal bore and a compression spring positioned in the internal bore;
   a blade retainer secured to a lower end of the spindle; the blade retainer having a pair of arms with each arm extending completely across the width of an underside of a mower blade;
   the mower blade assembled to a blade assembly pin that is inserted into the internal bore to compress the spring;
   the mower blade being rotatable between a disengaged position outside the pair of arms and an engaged position within the pair of arms while the spring exerts a force urging the blade assembly pin out and the mower blade against the pair of arms to lock the mower blade in the blade retainer.

2. The quick change rotary mower blade assembly of claim 1 wherein the blade retainer has an outer frame.

3. The quick change rotary mower blade assembly of claim 2 wherein the blade retainer has a gap between each arm and the outer frame.

4. The quick change rotary mower blade assembly of claim 2 wherein each arm has an intermediate cross member that is spaced from the outer frame of the blade retainer.

5. The quick change rotary mower blade assembly of claim 2 wherein each arm has a first upright and a second upright; the second upright being spaced from the outer frame by a gap at least as thick as the mower blade.

6. A quick change rotary mower blade assembly, comprising:
   a mower blade attached to a blade assembly pin;
   the blade assembly pin inserted into an internal bore of a spindle extending through a housing on a mower deck;
   a blade retainer on a lower end of the spindle and having a pair of arms extending completely across an underside of the mower blade and holding the mower blade in place in an engaged position, and releasing the mower blade if the mower blade is rotationally displaced from the blade retainer in a disengaged position; and
   a spring in the internal bore urging the mower blade against the blade retainer.

7. The quick change rotary mower blade assembly of claim 6 wherein the blade retainer has a generally rectangular outer frame and a centrally positioned hole that fits over the lower end of the spindle.

8. The quick change rotary mower blade assembly of claim 6 wherein the mower blade is assembled to the blade assembly pin before the blade assembly pin is inserted into the internal bore of the spindle.

* * * * *